US007145131B2

(12) United States Patent
Mizuno et al.

(10) Patent No.: US 7,145,131 B2
(45) Date of Patent: Dec. 5, 2006

(54) ABSOLUTE ENCODER

(75) Inventors: Seiichiro Mizuno, Hamamatsu (JP); Yukinobu Sugiyama, Hamamatsu (JP)

(73) Assignee: Hamamatsu Photonics K.K., Shizuoka (JP)

( * ) Notice: Subject to any disclaimer, the term of this patent is extended or adjusted under 35 U.S.C. 154(b) by 0 days.

(21) Appl. No.: 10/911,471

(22) Filed: Aug. 5, 2004

(65) Prior Publication Data

US 2005/0072912 A1 Apr. 7, 2005

(30) Foreign Application Priority Data

Aug. 6, 2003 (JP) ............................ P2003-287996

(51) Int. Cl.
*G01D 5/34* (2006.01)
(52) U.S. Cl. .............................. 250/231.18; 250/208.2; 250/231.13; 356/138
(58) Field of Classification Search ........... 250/231.13, 250/231.14, 231.18, 208.2; 356/138
See application file for complete search history.

(56) References Cited

U.S. PATENT DOCUMENTS

| | | | | |
|---|---|---|---|---|
| 4,654,524 A | * | 3/1987 | Kita | 250/231.14 |
| 4,720,631 A | * | 1/1988 | Lapeyre | 250/231.18 |
| 5,965,879 A | * | 10/1999 | Leviton | 250/231.13 |
| 2004/0227065 A1 | * | 11/2004 | Thorburn | 250/231.13 |

FOREIGN PATENT DOCUMENTS

| | | | |
|---|---|---|---|
| JP | 57-118642 | | 7/1982 |
| JP | 57119215 A | * | 7/1982 |
| JP | 61-129528 | | 6/1986 |
| JP | A-2000-514199 | | 10/2000 |
| JP | 2001-194187 | | 7/2001 |
| JP | A-2002-39727 | | 2/2002 |

* cited by examiner

*Primary Examiner*—Thanh X. Luu
*Assistant Examiner*—Stephen Yam
(74) *Attorney, Agent, or Firm*—Drinker, Biddle & Reath LLP

(57) ABSTRACT

The first opening 31 and second opening 32 are formed in the rotating plate 3 attached to the rotation axis 2 of an absolute encoder 1 in a prescribed positional relation, and a two-dimensional profile sensor 5 is installed so as to face the lower side 3a of the rotating plate 3. Also, a light supplying unit 4 consisting of light sources 41 and 42 is installed so as to face the photosensitive area of the profile sensor 5 with the openings 31 and 32 of the rotating plate 3 placed therebetween. And, based on a correlation between the first detected position P1 and second detected position P2 where measuring light emitted from the light sources 41 and 42 is passed through the openings 31 and 32 of the rotating plate 3 and is detected by the profile sensor 5, an absolute value of the rotating angle of the rotation axis 2 is calculated, wherein it is possible to achieve an absolute encoder capable of accurately measuring the absolute value of the rotating angle of the rotation axis with a simple construction.

8 Claims, 12 Drawing Sheets

*Fig.9*

| | REFERENCE POSITION COORDINATE | RELATIVE POSITION COORDINATE | ΔX | ΔY | ANGLE θ |
|---|---|---|---|---|---|
| A | (125,123) | (63,45) | -62 | -78 | -38 |
| B | | (125,37) | 0 | -86 | 0 |
| C | | (178,123) | 53 | 0 | 90 |
| D | | (158,158) | 33 | 35 | 136.6 |

Fig.11

| | FIRST DETECTION POSITION COORDINATE | SECOND DETECTION POSITION COORDINATE | ΔX | ΔY | ANGLE θ |
|---|---|---|---|---|---|
| A | (103,96) | (54,33) | -49 | -63 | -128 |
| B | (128,88) | (128,8) | 0 | -80 | -90 |
| C | (168,128) | (248,128) | 80 | 0 | 0 |
| D | (155,157) | (210,215) | 55 | 58 | 46.6 |

ABSOLUTE ENCODER

BACKGROUND OF THE INVENTION

1. Field of the Invention

The present invention relates to an absolute encoder for measuring an absolute value of a rotating angle of an object to be measured.

2. Related Background of the Invention

Up until now, a rotary encoder has been employed for angular measurement in machine tools, FA (factory automation) apparatuses, and controlling ends (steering) of automobile, etc. In particular, as an angle detecting system of optical type rotary encoders of the rotary encoders, an incremental type and an absolute type have been known to the public. The absolute type rotary encoder (hereinafter called an "absolute encoder") generally ensures high accuracy and has an advantage by which errors are not accumulated.

In the absolute encoder, generally, a rotating plate in which light transmitting portions such as slits are provided at a prescribed pattern is attached to the rotation axis. And, a light source and a photodetector are installed with the rotating plate placed therebetween, wherein an absolute value of the rotating angle of a rotation axis is measured by detecting light, which is supplied from the light source and passes through the light transmitting portion of the rotating plate, by means of a photodetector.

Encoders that are disclosed in Document 1 "Japanese Translation of International Application (Kohyo) No. 2000-514199" and Document 2 "Japanese Published Unexamined Patent Application No. 2002-39727" have been known as prior art absolute encoders. For example, in the encoder disclosed in Document 1, a slit consisting of an eddy pattern is provided in the rotating plate, and a rotating angle is measured by detecting light passed through the eddy slit by means of a one-dimensional image sensor.

SUMMARY OF THE INVENTION

However, in such a construction where the rotating angle is measured by using such an eddy slit as described above, it is difficult to form the rotating plate with the slit pattern accurately positioned. Therefore, there is a problem in that it is difficult to sufficiently improve the measurement accuracy of the rotating angle. In addition, since high accuracy is required in terms of alignment between the one-dimensional image sensor and the rotating plate, the composition thereof and manufacturing process are complicated, resulting in an increase in production costs.

The present invention was developed in order to solve the above-described problem. It is therefore an object of the invention to provide an absolute encoder capable of accurately measuring an absolute value of the rotating angle of the rotation axis with a simplified construction.

In order to achieve such an object, an absolute encoder according to the invention comprises: (1) a rotation axis, (2) a rotating plate attached to the rotation axis, having a first opening and a second opening formed in a prescribed positional relation to the first opening, (3) a photodetector that has a photosensitive area in which a plurality of pixels are two-dimensionally arrayed, is provided so as to face one side of the rotating plate, and is able to obtain light intensity profiles in the first direction and second direction in the two-dimensional array, respectively, (4) light supplying means that is provided so as to face the photosensitive area of the photodetector with the first opening and second opening of the rotation plate placed therebetween and supplies measuring light for measuring an angle, and (5) angle calculating means for calculating an absolute value of the rotating angle of the rotation axis based on a correlation between a first detected position and a second detected position where the measuring light components passed through the first opening and second opening of the rotating plate are respectively detected by the photosensitive area of the photodetector.

In the above-described absolute encoder, an absolute value of the rotating angle is measured by utilizing two openings formed in the rotating plate. Although, in the two openings, the relative positions thereof are fixed with respect to the rotating plate, the absolute positions and positional relationship vary in line with rotation of the rotation axis and rotating plate. And, a change in the absolute positional relationship of the openings of the rotating plate will correspond to the rotating angle of the rotating plate. Therefore, by optically detecting the change in the positional relationship of the two openings with the measuring light, it is possible to measure the absolute value of the rotating angle of the rotation axis and rotating plate.

Also, a photodetector composed so as to function as a profile sensor with respect to two directions in the two-dimensional array is used to detect measuring light passed through the two openings, respectively, whereby it is possible to preferably and accurately detect a change in the positional relationship of the above-described two openings. And, by using the rotating plate in which two openings are formed and the two-dimensional photodetector, an absolute encoder capable of accurately measuring the absolute value of the rotating angle of the rotation axis with a simplified construction can be achieved.

Herein, it is preferable that, in the photodetector, one pixel is composed of a plurality of photosensitive portions outputting an electric current responsive to the intensity of respective incident light components being disposed on the same plane adjacent to each other, photosensitive portions at one side of a plurality of photosensitive portions composing corresponding respective pixels are electrically connected to each other over a plurality of pixels arrayed in the first direction, and photosensitive portions at the other side of a plurality of photosensitive portions composing corresponding respective pixels are electrically connected to each other over a plurality of pixels arrayed in the second direction.

In such a photodetector, light made incident into one pixel is detected by a plurality of photosensitive portions that compose the pixel, respectively. And, since the photosensitive portions at one side are electrically connected to each other over a plurality of pixels arrayed in the first direction, current output from the photosensitive portion at one side is sent in the first direction. Also, since the photosensitive portions at the other side are electrically connected to each other over a plurality of pixels arrayed in the second direction, current output from the photosensitive portion at the other side is sent in the second direction. Therefore, a two-dimensional profile sensor capable of independently obtaining the light intensity profile in the first direction and the light intensity profile in the second direction, respectively, can be composed. As a result, by a remarkably simplified construction in which a plurality of photosensitive portions are provided in one pixel, it is possible to detect the two-dimensional position of measuring light passed through the two openings, respectively, at a high speed.

In a case where the above-described construction is employed, the encoder preferably comprises a first signal processing circuit which is provided corresponding to the photosensitive portion group at one side, electrically connected to each other between a plurality of pixels arrayed in the first direction, and which outputs a voltage signal by carrying out a prescribed signal process onto an electric current output from the photosensitive portion group at one side, and a second signal processing circuit which is provided corresponding to the photosensitive portion group at the other side, electrically connected to each other between a plurality of pixels arrayed in the second direction, and which outputs a voltage signal by carrying out a prescribed signal process onto an electric current output from the photosensitive portion group at the other side, wherein the angle calculating means calculates the absolute value of the rotating angle of the rotation axis on the basis of the voltage signals output from the first signal processing circuit and second signal processing circuit.

Also, the encoder may be configured in that the angle calculating means calculates the absolute value of the rotating angle of the rotation axis with reference to an angle calculating table showing a matching relationship between the correlation between the first detected position and the second detected position and the absolute value of the rotating angle of the rotation axis. Thus, by preparing a table (ROM table) in which the correlation of two detected positions corresponding to the positional relationship of two openings of the rotating plate is matched to the absolute values of the rotating angles in advance, it is possible to accurately calculate the rotating angle from a result of detection of measuring light in the photodetector at a high speed.

In addition, it is preferable that the light supplying means is provided with a first light source provided so as to face the photosensitive area of the photodetector with the first opening of the rotating plate placed therebetween, and a second light source provided so as to face the photosensitive area of the photodetector with the second opening placed therebetween. Furthermore, in this case, if the first light source and the second light source supply measuring light under supplying conditions differing from each other, it is possible to easily identify the first detected position in the photodetector corresponding to the first opening and the second detected position corresponding to the second opening. Or, the light supplying means may be composed of a single light source or a combination of light source and reflecting optical system.

Also, it is preferable that the second opening of the rotating plate is formed at a prescribed position located on the extension of the straight line from the rotation axis toward the first opening, whereby it is possible to preferably calculate the absolute value of the rotating angle based on the positional relationship of two openings. However, various compositions other than the above arrangement of the two openings in the rotating plate may be employed.

In addition, the rotating plate may have a third opening formed in a prescribed positional relation to the first opening and the second opening, and the angle calculating means may be composed so that the absolute value of the rotating angle of the rotation axis is calculated based on a correlation between the first detected position, the second detected position, and a third detected position where the measuring light component passed through the third opening of the rotating plate is detected by the photosensitive area of the photodetector. By using three openings as in the above, it is possible to improve the measurement accuracy of the absolute value of the rotating angle. In this case, it is preferable that the third opening of the rotating plate is formed at a prescribed position excepting on the straight line connecting the first opening and the second opening. Further, in such a composition in which three openings are employed, it is preferable that the light supplying means is provided with the first light source fixed so as to face the photosensitive area of the photodetector with the first opening of the rotating plate placed therebetween, the second light source fixed so as to face the photosensitive area of the photodetector with the second opening placed therebetween, and the third light source fixed so as to face the photosensitive area of the photodetector with the third opening placed therebetween. Still further, in this case, if the first through third light sources supply measuring light under supplying conditions differing from each other, it becomes possible to easily identify the first through third detected positions. Or, the light supplying means may be composed of a single light source or a combination of light source and reflecting optical system.

BRIEF DESCRIPTION OF THE DRAWINGS

FIG. 9 is a table for calculating angles corresponding to the positional relationship of the detected positions illustrated in FIG. 8;

FIG. 11 is a table for calculating angles corresponding to the positional relationship of the detected positions illustrated in FIG. 10.

DESCRIPTION OF THE PREFERRED EMBODIMENTS

Hereinafter, a detailed description is given of preferred embodiments of an absolute encoder according to the present invention by reference to the drawings. Also, parts which are identical to each other in the description of the accompanying drawings are given the same reference numbers, and overlapping description thereof is omitted. In addition, dimensional ratios of the drawings are not necessarily coincident with those in the description.

Figure 1:
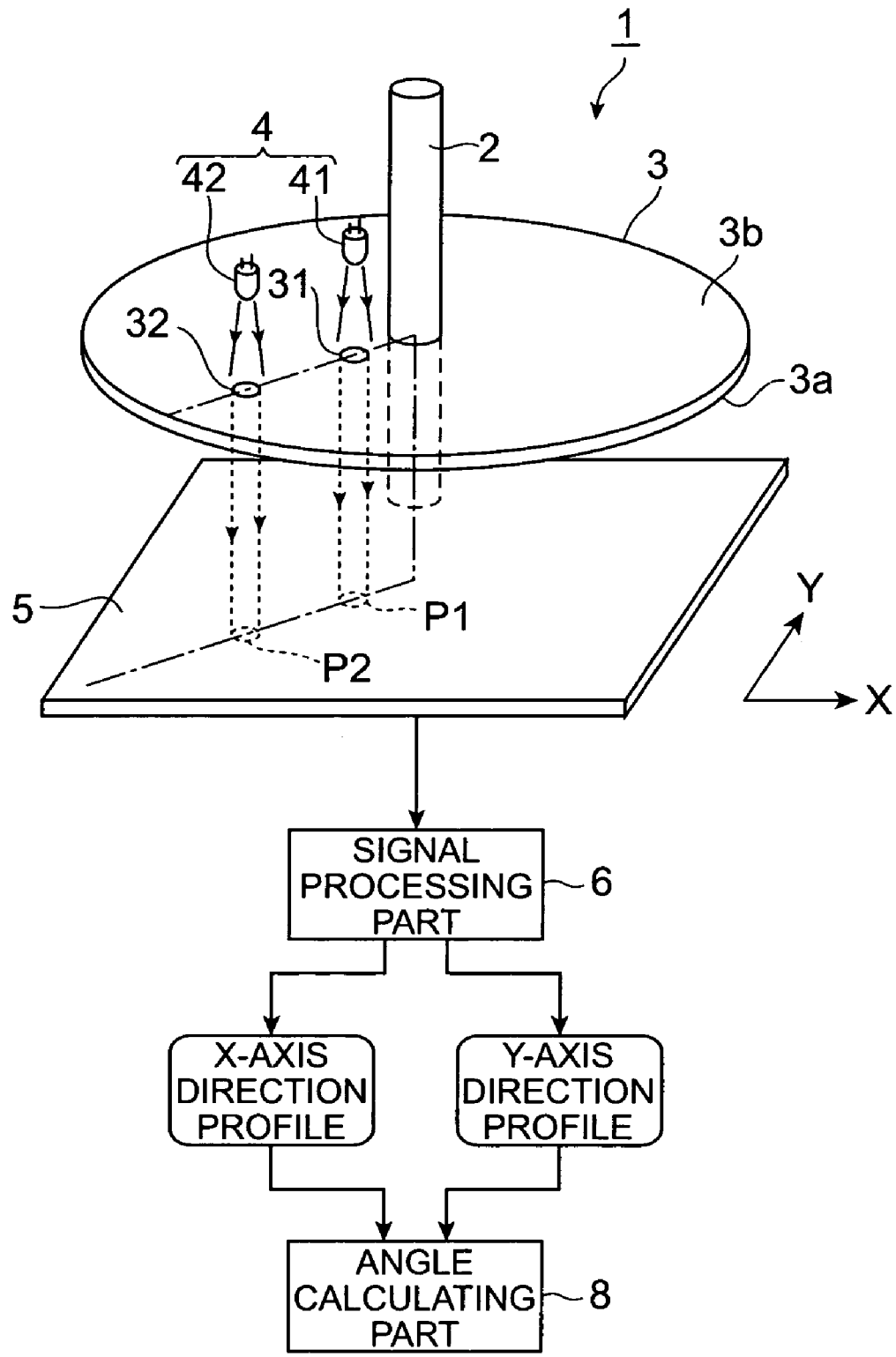
FIG. 1 is a perspective view showing a construction of one embodiment of the absolute encoder.

FIG. 1 is a perspective view showing a construction of one embodiment of an absolute encoder according to the invention. Referring to FIG. 1, an absolute encoder 1 according to the embodiment is provided with a rotation axis 2, a rotating plate 3, a light supplying unit 4 and a profile sensor 5. The rotation axis 2 is attached to an object the rotating angle of which is to be detected, and is supported by a housing of the absolute encoder 1 (not illustrated). The rotating plate 3 is a disc-shaped member formed of, for example, metal or resin, and the center thereof is attached to and fixed on the rotation axis 2.

The first opening 31 and the second opening 32 having a prescribed positional relation with respect to the first opening 31 are formed in the rotating plate 3. These two openings 31 and 32 are used to measure the absolute value of the rotating angle of the rotation axis 2 and rotating plate 3 in the present encoder 1 as described later. In addition, in the present embodiment, the openings 31 and 32 are formed, as shown by a dot-dashed line in FIG. 1, in the rotating plate 3 so that the second opening 32 is located at a prescribed position on the extension of the straight line from the rotation axis 2 toward the first opening 31.

With respect to the rotating plate 3, the profile sensor 5 is provided so as to face one side of the rotating plate 3 (that is, the lower side 3a in FIG. 1). The profile sensor 5 is a two-dimensional photodetector having a photosensitive area in which a plurality of pixels for outputting an electric current in response to the intensity of respective incident light components are two-dimensionally arrayed, and the profile sensor 5 is disposed so that the center of the photosensitive area comes almost onto the center axis of the rotation axis 2.

The light supplying unit 4 is installed at the other side (that is, the upper side 3b) of the rotating plate 3. The light supplying unit 4 is light supplying means for supplying measuring light for angle measurement and is disposed so as to face the photosensitive area of the profile sensor 5 with the openings 31 and 32 of the rotating plate 3 placed therebetween. In the present embodiment, the light supplying unit 4 is composed to have two light sources which are the first light source 41 and second light source 42. The first light source 41 is provided so as to face the profile sensor 5 with the first opening 31 of the rotating plate 3 placed therebetween while the second light source 42 is provided so as to face the profile sensor 5 with the second opening 32 placed therebetween. For example, LEDs may be used as the light sources 41 and 42.

In the above-described construction, as measuring light is irradiated from the first light source 41 of the light supplying unit 4 toward the rotating plate 3, a part thereof passes through the first opening 31 and is detected at the first detected position P1 in the photosensitive area of the profile sensor 5. Also, as measuring light from the second light source 42 is irradiated toward the rotating plate 3, a part thereof passes through the second opening 32 and is detected at the second detected position P2 in the photosensitive area of the profile sensor 5.

In the present encoder 1, the signal processing part 6 and angle calculating part 8 are provided in regard to detection signals output from the profile sensor 5 that detects measuring light. The signal processing part 6 carries out a prescribed signal process with respect to an electric current output which is a detection signal from respective pixels of the profile sensor 5 and outputs a voltage signal. Also, the voltage signal from the signal processing part 6 is input into the angle calculating part 8. The angle calculating part 8 obtains the first detected position P1 corresponding to the measuring light component passed through the first opening 31 and the second detected position P2 corresponding to the measuring light component passed through the second opening 32 on the basis of voltage signals from the signal processing part 6 showing a result of detection of the measuring light in the profile sensor 5. Based on the correlation between these detected positions P1 and P2, the absolute value of the rotating angle of the rotation axis 2 and the rotating plate 3 is calculated.

Figure 2:
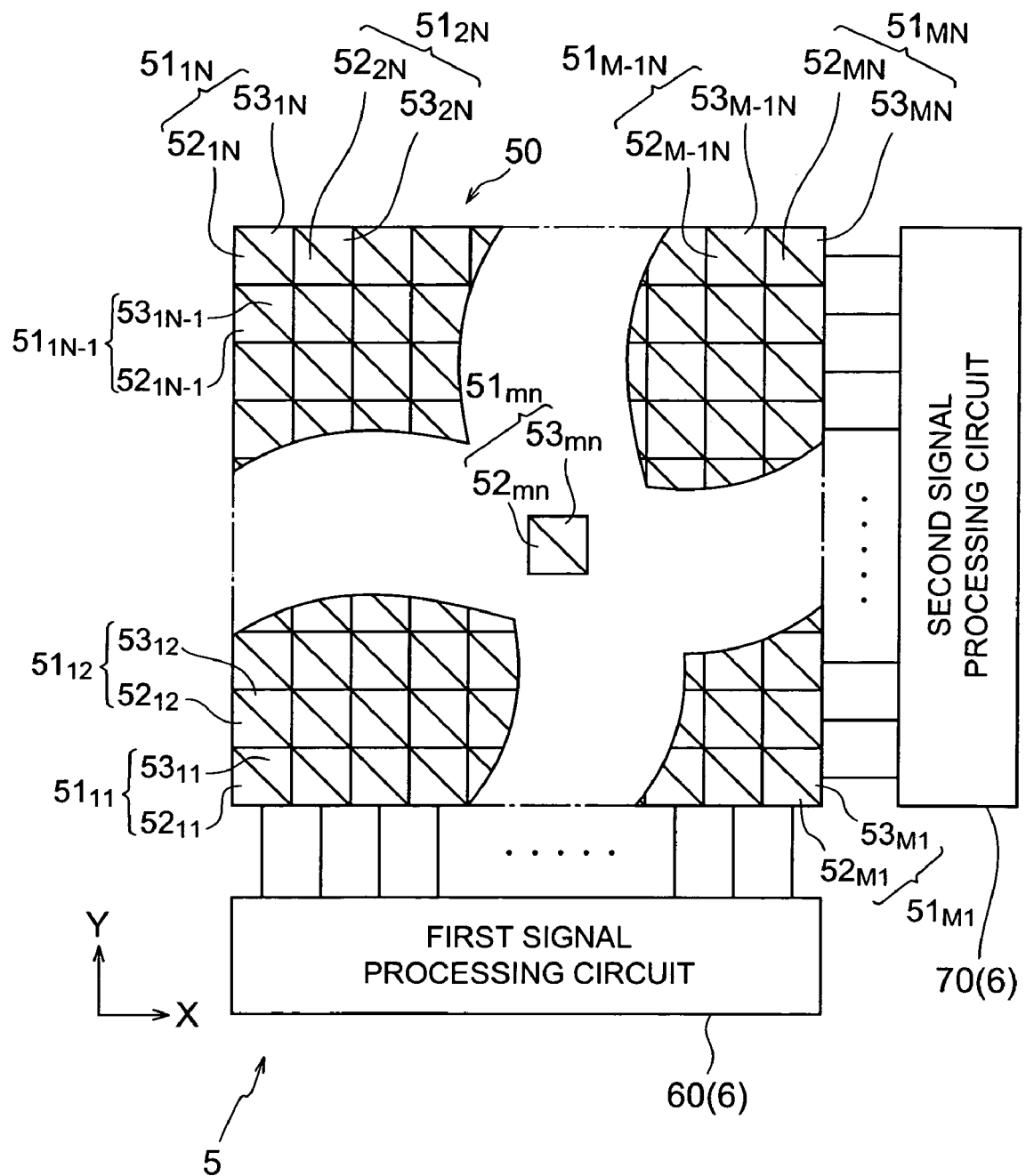
FIG. 2 is a diagram schematically showing a construction of a profile sensor used in the absolute encoder illustrated in FIG. 1.

Next, a detailed description is given of the profile sensor 5 used in the encoder 1 shown in FIG. 1. FIG. 2 is a diagram schematically showing a construction of the profile sensor 5. Hereinafter, it is assumed that parameters M and N are integral numbers no less than 2, respectively. Also, unless otherwise specified, it is assumed that a parameter m is an arbitrary integral number no less than 1 but no more than M, and a parameter n is an arbitrary integral number no less than 1 but no more than N.

The profile sensor 5 in the encoder 1 according to the present embodiment is provided with a photosensitive area 50, first signal processing circuit 60, and second signal processing circuit 70. Of these components, the first signal processing circuit 60 and second signal processing circuit 70 compose the signal processing part 6 in the encoder 1 shown in FIG. 1.

In the photosensitive area 50, pixels $51_{mn}$ are two-dimensionally arrayed in M-row and N-column. One pixel is composed so that a photosensitive portion $52_{mn}$ (the first photosensitive portion) and a photosensitive portion $53_{mn}$ (the second photosensitive portion), which output an electric current responsive to the intensity of light made incident thereinto, are disposed on the same plane adjacent to each other, whereby, in the photosensitive area 50, the photosensitive portions $52_{mn}$ and the photosensitive portions $53_{mn}$ are arrayed on the same plane in a state where those two-dimensionally coexist.

In the photosensitive area 50 consisting of M×N pixels, photosensitive portions $52_{mn}$ (for example, photosensitive portions $52_{11}$ through $52_{1N}$) at one side of a plurality of photosensitive portions $52_{mn}$ and $53_{mn}$ that compose corresponding respective pixels $51_{mn}$ over a plurality (N) of pixels $51_{11}$ through $51_{1N}$, $51_{21}$ through $51_{2N}$, ... and $51_{M1}$ through $51_{MN}$ arrayed in the first direction (that is, the Y-axis direction in FIG. 2) in the two-dimensional array are electrically connected to each other. Also, photosensitive portions $53_{mn}$ (for example, photosensitive portions $53_{11}$ through $53_{M1}$) at the other side of a plurality of photosensitive portions $52_{mn}$ and $53_{mn}$ that compose corresponding respective pixels $51_{mn}$ over a plurality (M) of pixels $51_{11}$ through $51_{M1}$, $51_{12}$ through $51_{M2}$, ... and $52_{1N}$ through $51_{MN}$ arrayed in the second direction (that is, the X-axis direction) in the two-dimensional array are electrically connected to each other.

Figure 3:
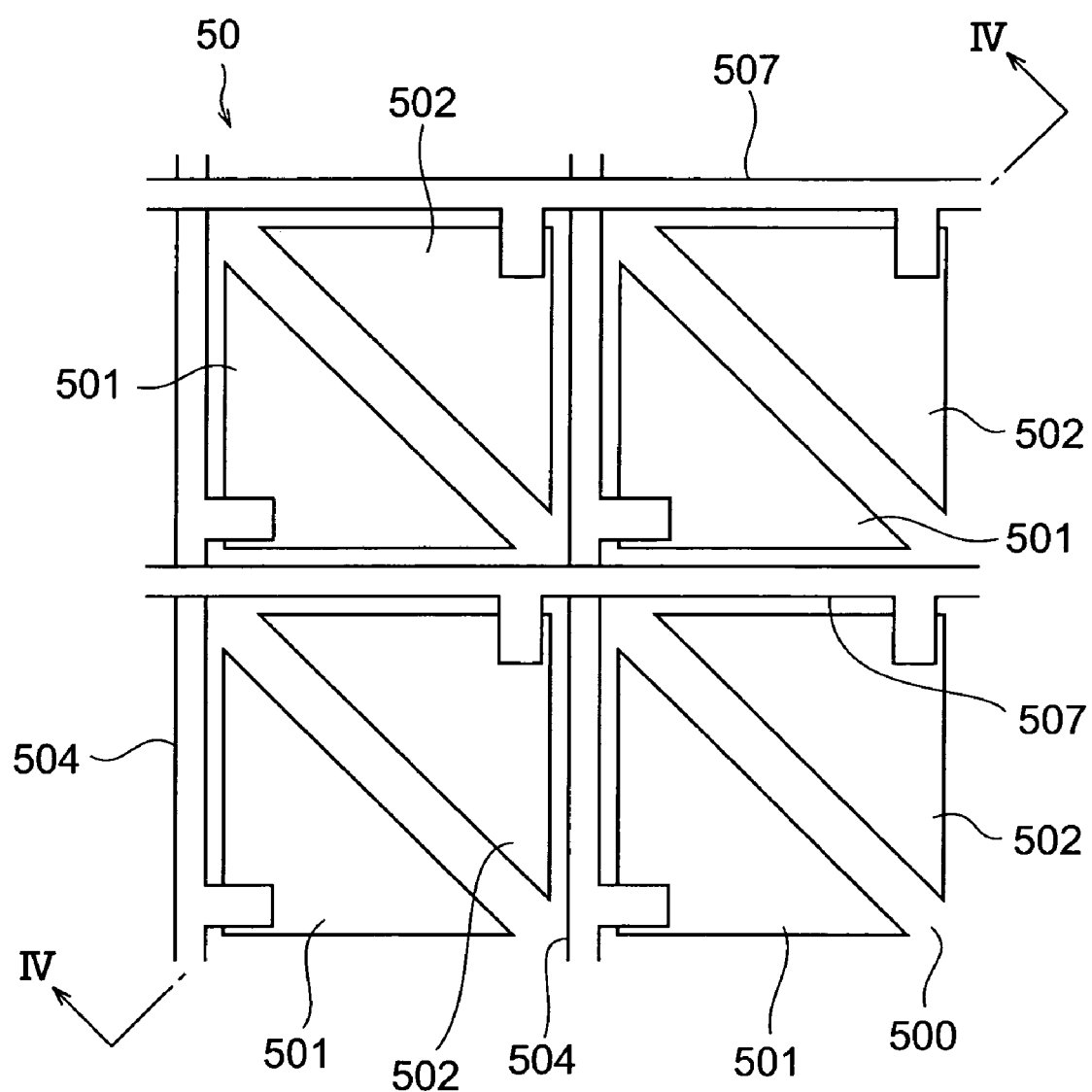
FIG. 3 is a plan view with the major parts enlarged, showing one example of a photosensitive area included in the profile sensor illustrated in FIG. 2.
Figure 4:
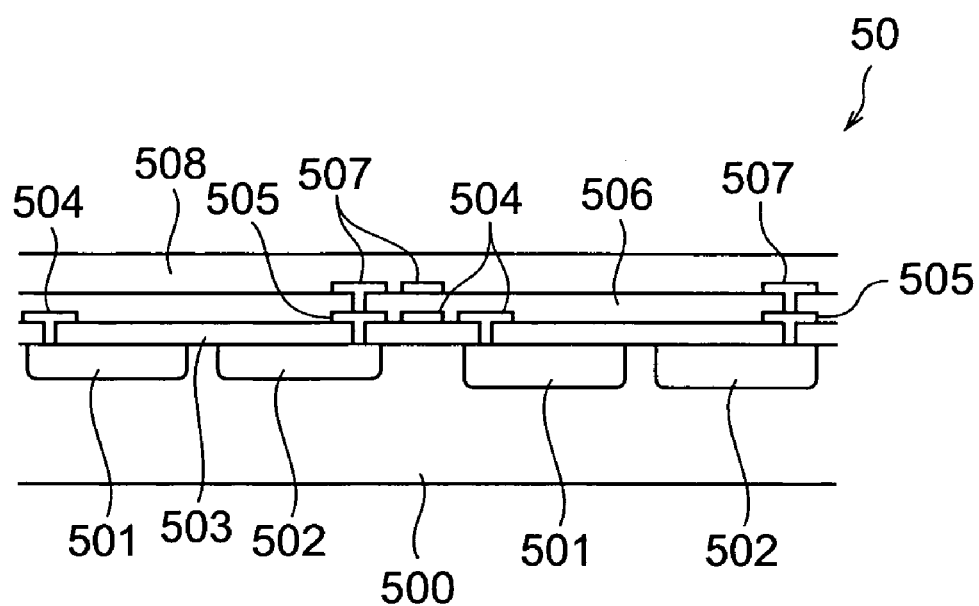
FIG. 4 is a sectional view taken along the line IV—IV in FIG. 3.

Here, based on FIG. 3 and FIG. 4, a description is given of the construction of the photosensitive area 50. FIG. 3 is a plan view with its major parts enlarged, which shows one example of the photosensitive area included in the profile sensor shown in FIG. 2. Also, FIG. 4 is a sectional view taken along the line IV—IV in FIG. 3. In addition, in FIG. 3, illustration of a protective layer 508 is omitted.

The photosensitive area 50 includes a semiconductor substrate 500 composed of a P-type (first conductive type) semiconductor and N-type (second conductive type) semiconductor areas 501 and 502 formed on the surface layer of the semiconductor substrate 500. Thereby, in the respective photosensitive portions $52_{mn}$ and $53_{mn}$, photodiodes are composed so as to include a portion of the semiconductor substrate 500 and one set of the second conductive type semiconductor areas 501 and 502. The semiconductor areas 501 and 502 are roughly triangular-shaped when being observed from the light incidence direction, wherein, in one pixel, two areas 501 and 502 are formed so that their sides are adjacent to each other. The semiconductor substrate 500 is set to the ground potential.

Further, the photosensitive area 50 may be composed to have a semiconductor substrate consisting of N-type semiconductor and a P-type semiconductor area formed on the surface layer of the semiconductor substrate. The area 501 corresponding to the photosensitive portion $52_{mn}$ and area 502 corresponding to the photosensitive portion $53_{mn}$ are arrayed alternately in the first direction and second direction as has been made clear in FIG. 3. In addition, the area 501 and area 502 are arrayed alternately in the third direction and fourth direction crossing the first direction and second direction (for example, crossing at 45 degrees).

The first insulation layer 503 is formed on the semiconductor substrate 500 and areas 501 and 502. And, the first wiring 504 is electrically connected to one area 501 via a through-hole formed in the first insulation layer 503. Also, an electrode 505 is electrically connected to the other area 502 via a through-hole formed in the first insulation layer 503. Further, the second insulation layer 506 is formed on the first insulation layer 503. And, the second wiring 507 is electrically connected to the electrode 505 via a through-hole formed in the second insulation layer 506, whereby the other area 502 is electrically connected to the second wiring 507 via the electrode 505.

A protective layer 508 is formed on the second insulation layer 506. The first insulation layer 503, second insulation layer 506 and protective layer 508 are composed of $SiO_2$ or SiN, etc. The first wiring 504, electrode 505 and second wiring 507 are composed of metal such as Al, etc.

The first wiring 504 electrically connects one areas 501 in the respective pixels $51_{mn}$ in the Y-axis direction, and extends in the Y-axis direction between the pixels $51_{mn}$. Thus, by connecting one area 501 in the respective pixels $51_{mn}$ by the first wiring 504, photosensitive portions $52_{mn}$ (for example, photosensitive portions $52_{11}$ through $52_{1N}$) at one side are electrically connected to each other over a plurality of pixels $51_{11}$ through $51_{1N}$, $51_{21}$ through $51_{2N}$, ... and $51_{M1}$ through $51_{MN}$ arrayed in the first direction in the two-dimensional array, wherein the photosensitive portions extending in the Y-axis direction are composed in the photosensitive area 50.

The photosensitive portions extending in the Y-axis direction are arranged in the X-axis direction and are formed to be M columns. Therefore, these photosensitive portions arranged in M columns function as a one-dimensional profile sensor in which the photosensitive portions extending in the Y-axis direction are arrayed along the X axis. A profile of light intensity is obtained with respect to the X-axis direction (the second direction) in the two-dimensional array in the photosensitive area 50 by the electric current output from the profile sensor. In addition, the current outputs from the M-column photosensitive portions are, respectively, input into the first signal processing circuit 60 as shown in FIG. 2.

The second wiring 507 electrically connects the other areas 502 in the respective pixels $51_{mn}$ in the X-axis direction, and extends in the X-axis direction between the pixels $51_{mn}$. Thus, by connecting the other area 502 in the respective pixels $51_{mn}$ by the second wiring 507, the photosensitive portions $53_{mn}$ (for example, the photosensitive portions $53_{11}$ through $53_{M1}$) at the other side are electrically connected over a plurality of pixels $51_{11}$ through $51_{M1}$, $51_{12}$ through $51_{M2}$, ... and $51_{1N}$ through $51_{MN}$, which are arrayed in the second direction in the two-dimensional array, and the photosensitive portions extending in the X-axis direction are composed in the photosensitive area 50.

The photosensitive portions extending in the X-axis direction are arranged in the Y-axis direction and are formed to be N rows. Therefore, the photosensitive portions arranged in N rows function as a one-dimensional profile sensor in which the photosensitive portions extending in the X-axis direction are arrayed along the Y-axis. A profile of light intensity is obtained with respect to the Y-axis direction (the first direction) in the two-dimensional array in the photosensitive area 50 by the electric current output from the profile sensor. In addition, the current outputs from the N-row photosensitive portions are, respectively, input into the second signal processing circuit 70 as shown in FIG. 2.

Also, with the above-described construction, in the photosensitive area 50 of the profile sensor 5, the photosensitive portions of M columns, which extend in the above-described Y-axis direction (the first direction), and the photosensitive portions of N rows, which extend in the X-axis direction (the second direction), are formed on the same plane.

Figure 5:
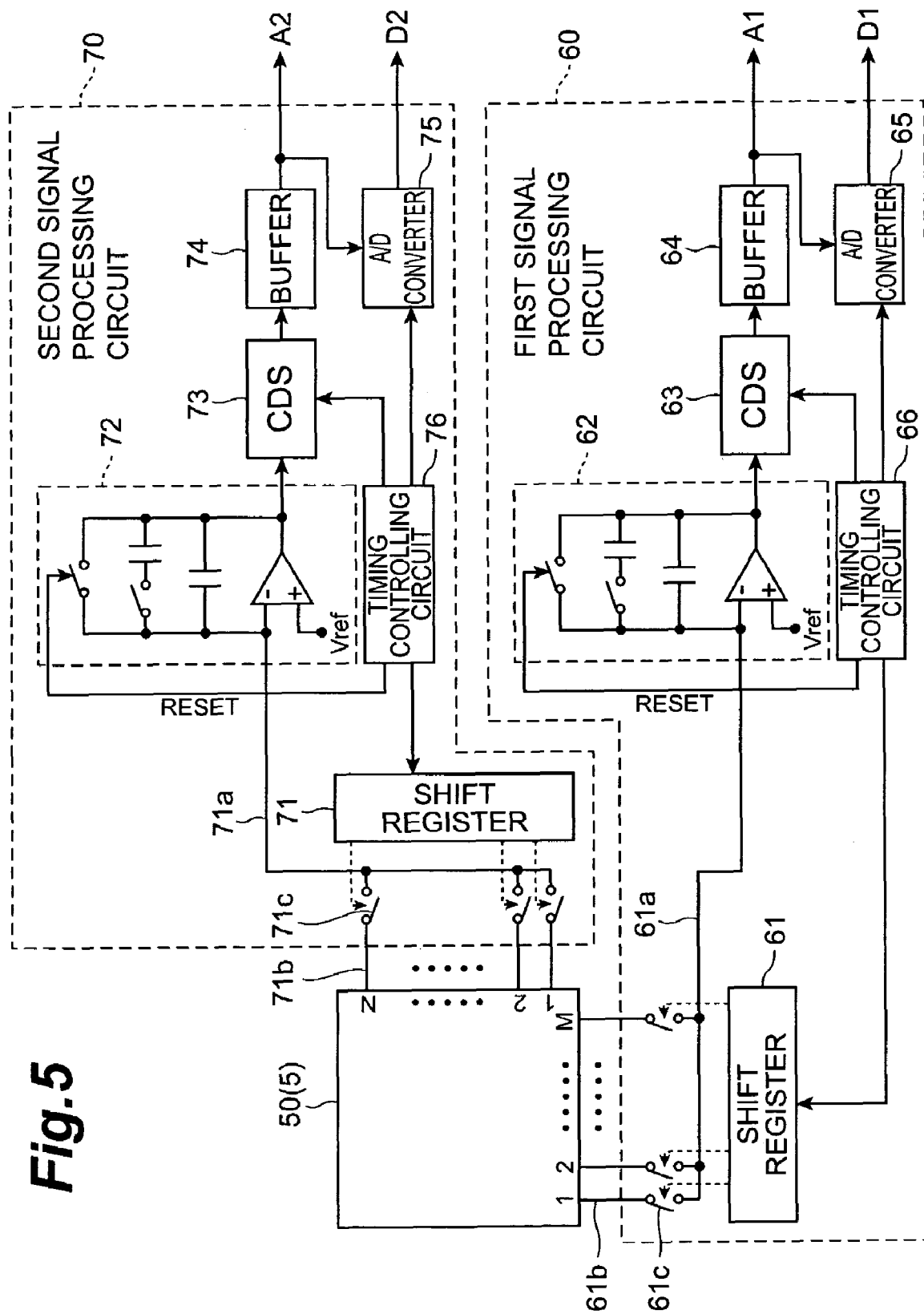
FIG. 5 is a configurational view showing a signal processing part consisting of the first signal processing circuit and second signal processing circuit.

Next, a detailed description is given of the signal processing part 6 and angle calculating part 8 in the encoder 1 shown in FIG. 1. FIG. 5 is a configurational view briefly showing the signal processing part 6 consisting of the first signal processing circuit 60 and the second signal processing circuit 70 (Refer to FIG. 2).

The first signal processing circuit 60 is provided, corresponding to the photosensitive portion $52_{mn}$ groups (the photosensitive portions of M columns, which extend in the Y-axis direction) electrically connected between a plurality of pixels $51_{11}$ through $51_{1N}$, $51_{21}$ through $51_{2N}$, ... $51_{M1}$ through $51_{MN}$ arrayed in the Y-axis direction, and carries out a prescribed signal process with respect to electric current outputs from the photosensitive portion groups and outputs voltage signals. The first signal processing circuit 60 includes a read-out circuit for reading out current outputs from the respective photosensitive portions of M columns, which includes a shift register 61, and an integrating circuit 62 set up with respect to the current outputs from the photosensitive portions.

The read-out circuit in the first signal processing circuit 60 includes wiring 61*a* by which the integrating circuit 62 and the read-out circuit are electrically connected to each other, wiring 61*b* provided with respect to the respective photosensitive portions (the photosensitive portion groups) of M columns by which the photosensitive portions and the wiring 61*a* are electrically connected to each other, and the shift register 61 for controlling read-out of electric charges from the respective photosensitive portions. Further, the wiring 61*b* from the photosensitive portions is provided with switches 61*c* for changing over connection between the respective photosensitive portions and the wiring 61*a*. The shift register 61 controls read-out of electric charges by controlling opening and closing of these switches 61*c*. By the read-out circuit having the above-described configuration, current outputs are read out in a prescribed sequence from the respective photosensitive portions of M columns in the photosensitive area 50 and are input into the integrating circuit 62.

The integrating circuit 62 integrates the current outputs (charges) read out from the respective photosensitive portions of M columns and converts the same to voltage signals. Analog voltage signals output from the integrating circuit 62 are input into an A/D converter 65 via a CDS circuit 63 and a buffer circuit 64 and are converted to digital signals in the A/D converter 65. Herein, output from the buffer circuit 64 becomes the first analog output A1 corresponding to the profile sensor consisting of photosensitive portions of M columns and output from the A/D converter 65 becomes the first digital output D1. Also, for example, a 10-bit ADC may be used as the A/D converter 65.

Also, a timing controlling circuit 66 is provided for the first signal processing circuit 60 having such a configuration. The timing controlling circuit 66 sends out a RESET instruction signal, which instructs a RESET operation for integration, to the integrating circuit 62, and sends out a read-out instruction signal, which instructs the timing and sequence for reading out the electric charges, to the shift register 61. In addition, the timing controlling circuit 66 sends out necessary instruction signals to the CDS circuit 63, A/D converter 65, etc.

The second signal processing circuit 70 is provided, corresponding to the photosensitive portion $53_{mn}$ groups (the photosensitive portions of N rows extending in the X-axis direction) electrically connected between a plurality of pixels $51_{11}$ through $51_{M1}$, $51_{12}$ through $51_{M2}$, . . . and $51_{1N}$ through $51_{MN}$ which are arrayed in the X-axis direction, and carries out a prescribed signal process with respect to electric current outputs from the photosensitive portion groups, and outputs voltage signals. The second signal processing circuit 70 includes a read-out circuit for reading out current outputs from the respective photosensitive portions of N rows, which includes the shift register 71, and an integrating circuit 72 set up with respect to the current outputs from the photosensitive portions.

The read-out circuit in the second signal processing circuit 70 includes wiring 71*a* for electrically connecting an integrating circuit 72 and a read-out circuit to each other, wiring 71*b* provided with respect to the respective photosensitive portions (photosensitive portion groups) of N rows, by which the photosensitive portions and wiring 71*a* are electrically connected to each other, and a shift register 71 for controlling read-out of electric charges from the respective photosensitive portions. Also, the wiring 71*b* from the photosensitive portions is provided with switches 71*c* for changing over connection between the respective photosensitive portions and the wiring 71*a*. The shift register 71 controls read-out of electric charges by controlling opening and closing of these switches 71*c*. By the read-out circuit having the above-described configuration, current outputs are read out in a prescribed sequence from the respective photosensitive portions of N rows in the photosensitive area 50 and are input into the integrating circuit 72.

The integrating circuit 72 integrates the current outputs (charges) read out from the respective photosensitive portions of N rows and converts the same to voltage signals. Analog voltage signals output from the integrating circuit 72 are input into an A/D converter 75 via a CDS circuit 73 and a buffer circuit 74 and are converted to digital signals in the A/D converter 75. Herein, output from the buffer circuit 74 becomes the second analog output A2 corresponding to the profile sensor consisting of photosensitive portions of N rows and output from the A/D converter 75 becomes the second digital output D2. Also, for example, a 10-bit ADC may be used as the A/D converter 75.

In addition, a timing controlling circuit 76 is provided for the second signal processing circuit 70 having such a construction. The timing controlling circuit 76 sends out a RESET instruction signal, which instructs a RESET operation for integration, to the integrating circuit 72, and sends out a read-out instruction signal, which instructs the timing and sequence, etc., of a charge read-out operation, to the shift register 71. Further, the timing controlling circuit 76 sends out necessary instruction signals to the CDS circuit 73, A/D converter 75, etc.

Figure 6:
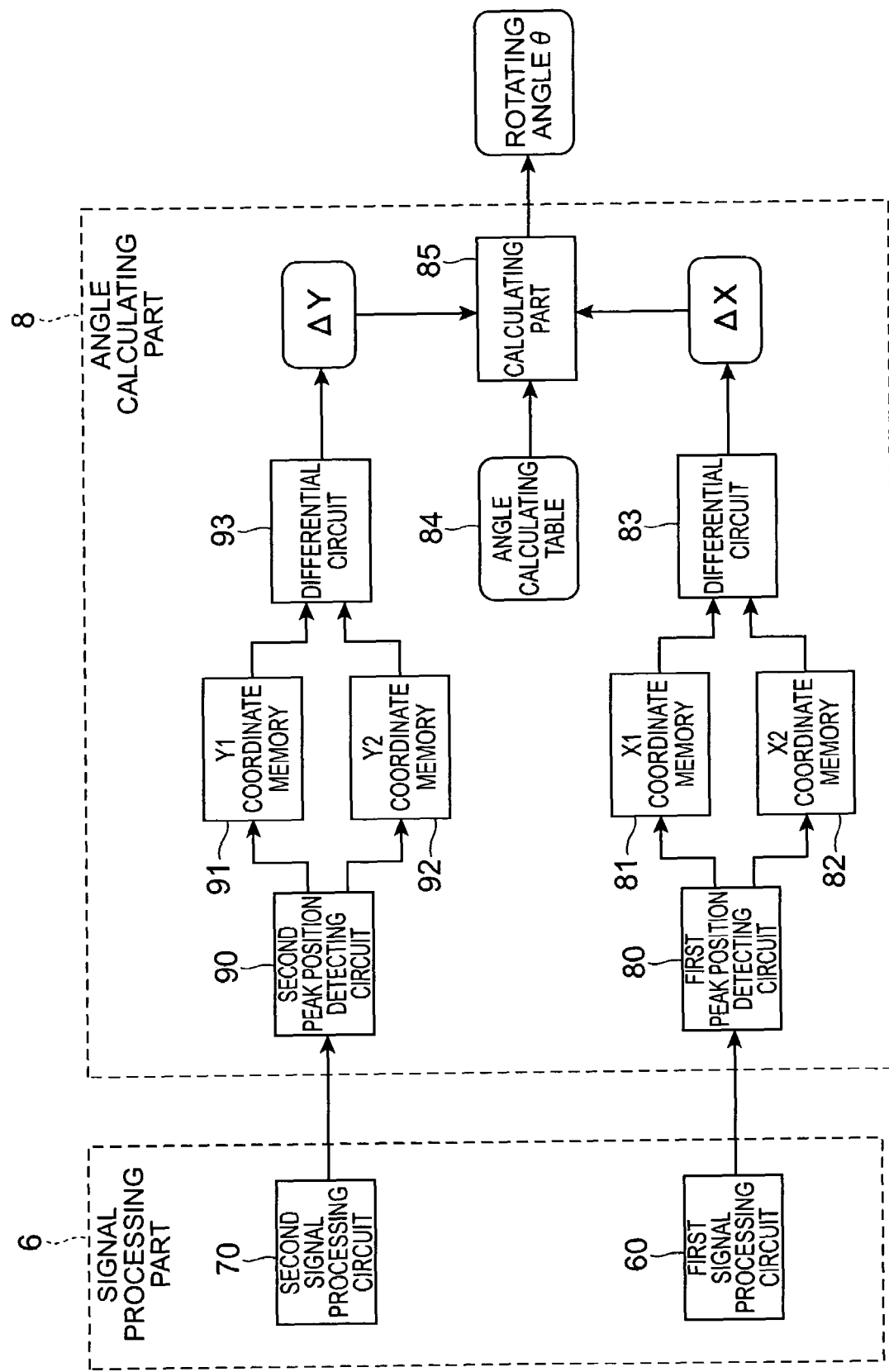
FIG. 6 is a block diagram showing a construction of the signal processing part and angle calculating part.
Figure 7:
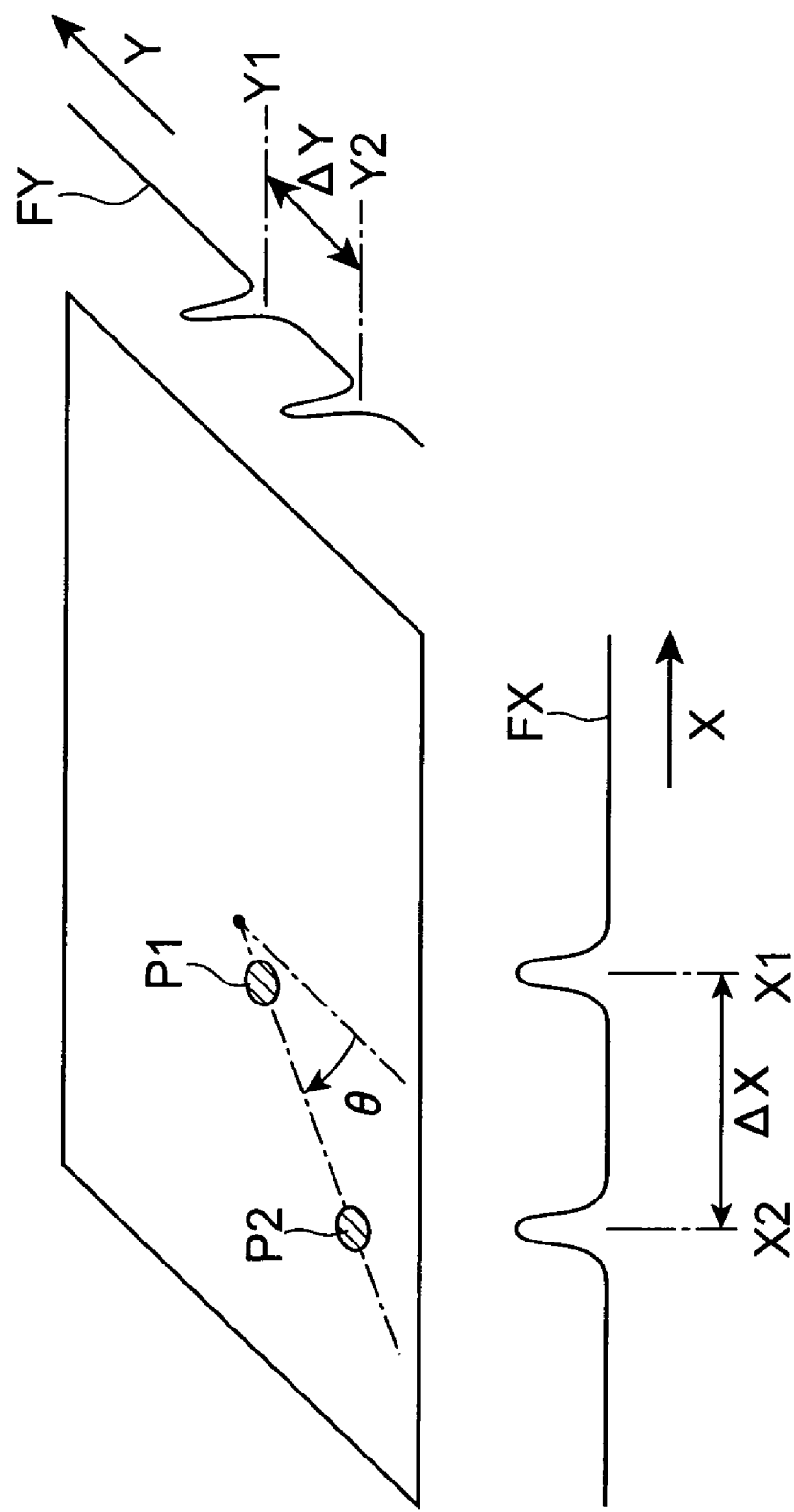
FIG. 7 is a view showing a method for measuring angles in the encoder illustrated in FIG. 1.

FIG. 6 is a block diagram briefly showing the configuration of the signal processing part 6 and angle calculating part 8 in the encoder 1 shown in FIG. 1. Also, FIG. 7 is a view showing a method for measuring angles in the encoder 1 shown in FIG. 1.

A voltage signal output from the first signal processing circuit 60 of the signal processing part 6 is input into the first peak position detecting circuit 80 of the angle calculating part 8. The first peak position detecting circuit 80 detects two peaks (one peak in the case of overlapping) from the profile FX of light intensity with respect to the X-axis direction based on the voltage signal from the signal processing circuit 60 as shown in FIG. 7. And, X coordinates X1 and X2 corresponding to the first detected position P1 and second detected position P2 are specified on the basis of these peak positions and are, respectively, stored in the X1 coordinate memory 81 and X2 coordinate memory 82. Further, an X coordinate interval $\Delta X$ is obtained by a differential between X1 and X2 in the first differential circuit 83.

The voltage signal output from the second signal processing circuit 70 of the signal processing part 6 is input into the second peak position detecting circuit 90 of the angle calculating part 8. The second peak position detecting circuit 90 detects two peaks (one peak in the case of overlapping) from the profile FY of light intensity with respect to the Y-axis direction based on the voltage signal from the signal processing circuit 70 as shown in FIG. 7. And, Y coordinates Y1 and Y2 corresponding to the first detected position P1 and the second detected position P2 are specified from the peak positions and are, respectively, stored in the Y1 coordinate memory 91 and Y2 coordinate memory 92. Further, a Y coordinate interval $\Delta Y$ is obtained by a differential between Y1 and Y2 in the second differential circuit 93.

The coordinate intervals $\Delta X$ and $\Delta Y$ obtained by the differential circuits 83 and 93 are, respectively, input into the calculating part 85. Also, the X coordinates X1, X2 and Y coordinates Y1, Y2 are input into the calculating part 85 as necessary. In addition, in the present embodiment, an angle calculating table 84 showing the matching relationship between the correlation between the first detected position P1 and the second detected position P2 to the absolute value of the rotating angle $\theta$ of the rotation axis 2 is prepared in advance with respect to the calculating part 85. The calculating part 85 calculates and outputs the rotating angle $\theta$ by referencing information regarding the detected position of measurement light such as input coordinate intervals $\Delta X$ and $\Delta Y$ and information stored in the ROM table 84.

A description is given of effects of an absolute encoder according to the above-described embodiment.

In the absolute encoder 1 shown in FIG. 1, an absolute value of the rotating angle $\theta$ is measured by utilizing two openings 31 and 32 formed in the rotating plate 3 attached to the rotation axis 2. As regards the openings 31 and 32, the relative positions are fixed with respect to the rotating plate 3. However, the absolute positions and positional relationship thereof vary in line with the rotation of the rotation axis 2 and rotating plate 3. And, changes in the absolute positional relationship between the openings 31 and 32 of the rotating plate 3 correspond to the rotating angle $\theta$ of the rotating plate 3. Therefore, by optically detecting the changes in the positional relationship between the two openings 31 and 32 by the measuring light emitted from the light supplying unit 4, it is possible to measure the absolute value of the rotating angle θ of the rotation axis 2 and rotating plate 3.

Also, the measuring light components passed through the openings 31 and 32 are detected by the profile sensor 5 that is a photodetector composed so as to function as profile sensors with respect to the X-axis direction and Y-axis direction in the two-dimensional array of the pixels $51_{mn}$, respectively, whereby the detected positions P1 and P2 corresponding to the openings 31 and 32 are acquired. Therefore, it is possible to accurately and preferably detect changes in the positional relationship of the above-described two openings 31 and 32. And, by using the rotating plate 3 in which two openings 31 and 32 are formed and the two-dimensional profile sensor 5, an absolute encoder 1 capable of accurately measuring the absolute value of the rotating angle θ of the rotation axis 2 can be achieved.

With the encoder 1 with such a construction, manufacture of the rotating plate and alignment of a rotating plate with a photodetector can be further facilitated in comparison with such a configuration (Refer to Document 1) in which a rotation angle is measured by using an eddy-shaped slit, etc. Therefore, construction of the encoder and manufacturing process thereof can be simplified. In addition, production costs thereof can be decreased. Also, since the rotating angle θ can be calculated by using the positional relationship (positional relationship between the detected positions P1 and P2) of the openings 31 and 32 and circular functions, etc., not depending on the rotation axis 2, a lowering in accuracy of the rotating angle θ due to eccentricity can be sufficiently suppressed to be low.

Also, in an optical type encoder, where dust is adhered to pixels of a photodetector, an error in angle measurement becomes a problem. As regards such an error in angle measurement, Document 2 describes compensating means which takes into consideration a case where dust is adhered. However, in a construction in which such compensating means is provided, there arises another problem in connection with an increase in hardware scale, calculation time for angle measurement, and costs for the compensation. To the contrary, in the absolute encoder 1 having the above-described construction, even in a case where dust is adhered to the pixels on the profile sensor 5, it is possible to obtain the rotating angle θ at sufficient accuracy as long as the entirety of the range in which light passed through the openings 31 and 32 is made incident into the photosensitive area 50 is not covered up with dust.

Further, in the above-described embodiment, the profile sensor 5 having such a configuration as shown in FIG. 2 through FIG. 4 is used as a photodetector. In such a profile sensor 5, light made incident into one pixel $51_{mn}$ is detected by a plurality of photosensitive portions $52_{mn}$ and $53_{mn}$ which compose the pixel $51_{mn}$, respectively. And, the photosensitive portions $52_{mn}$ at one side are electrically connected to each other over a plurality of pixels arrayed in the Y-axis direction, and the current output is sent in the Y-axis direction. Also, the photosensitive portions $53_{mn}$ at one side are electrically connected to each other over a plurality of pixels arrayed in the X-axis direction, and the current output is sent in the X-axis direction.

Accordingly, a two-dimensional profile sensor 5, by which a profile of light intensity in the X-axis direction and a profile of light intensity in the Y-axis direction can be independently obtained, can be constructed. As a result, with a remarkably simple construction in which a plurality of photosensitive portions $52_{mn}$ and $53_{mn}$ are provided in one pixel $51_{mn}$, the two-dimensional positions P1 and P2 of measuring light passed through two openings 31 and 32, respectively, can be detected at a high speed. Further, by detecting the two-dimensional positions P1 and P2 of the measuring light components at a high speed, real-time measurement of the rotating angle θ can be improved.

Still further, with the first signal processing circuit 60 and the second signal processing circuit 70, the examples of which are shown in FIG. 5, provided for the photosensitive area 50 of the profile sensor 5 having such a construction, the above-described two-dimensional positions P1 and P2 can be securely detected at a high speed. Such signal processing circuits may be composed to be a profile sensor 5 as the entirety by installing the same on the same chip as that of the photosensitive area 50. In addition, the angle calculating part 8 may be provided on the same chip or outside the chip.

Here, for example, circular slits passing through the rotating plate 3 may be employed as the openings 31 and 32 fixed on the rotating plate 3. However, generally, it is sufficient that they may be light transmitting portions of a prescribed shape. For example, a light transmitting portion having an opening, which is formed of a material capable of transmitting measuring light emitted from the light supplying unit 4, may be used. Such a light transmitting portion may be formed of a plate-like material, such as plate glass, capable of transmitting measuring light, with parts applied with a non-transmitting printing other than an opening.

In addition, as shown in FIG. 1, such a construction, in which light sources 41 and 42 respectively corresponding to the openings 31 and 32, may be employed as the light supplying unit 4 for supplying measuring light to the openings 31 and 32 of the rotating plate 3. Furthermore, in such a construction, the first light source 41 corresponding to the opening 31 and the second light source 42 corresponding to the opening 32 may be composed so that measuring light is supplied under supplying conditions differing from each other. In this case, it becomes possible to easily identify the first detected position P1 by the profile sensor 5 corresponding to the first opening 31 and the second detected position P2 corresponding to the second opening 32. A method for varying the supply timing of measuring light from the light sources 41 and 42 and a method for varying the intensity of measuring light are available as such a method for supplying measuring light. Also, such a construction may be employed, in which the areas of the openings 31 and 32 are changed at the rotating plate 3 side, not at the light supplying unit 4 side.

However, with respect to supply of measuring light from the light supplying unit 4, the measuring light may be emitted to the openings 31 and 32 under the same conditions. Even in such a case, a fixed restriction may be brought about in connection with the positional relationship between the detected positions P1 and P2 in the profile sensor 5 due to the positional relationship between the openings 31 and 32 in the rotating plate 3. Therefore, it is possible to identify the first detected position P1 and the second detected position P2. In addition, as the construction of the light supplying unit 4, various constructions may be employed, for example, one of which is provided with one light source for both the openings 31 and 32, and another of which is composed of combination of light source and reflecting optical system. Or, an optical system for contraction and/or enlargement may be provided, as necessary, between the light supplying unit 4 and the rotating plate 3 or between the rotating plate 3 and the profile sensor 5.

Also, in regard to calculation of the rotating angle θ in the angle calculating part 8, the rotating angle θ may be calculated by carrying out calculations of $\theta = \tan^{-1}(\Delta X/\Delta Y)$ using a circular function on the basis of coordinate intervals ΔX and ΔY. Or, as shown in FIG. 6, by preparing a table 84 for angle calculation, an absolute value of the rotating angle θ may be calculated with reference to the table 84. Thus, by preparing in advance a ROM table for matching the correlation between the two detected positions P1 and P2 equivalent to the positional relationship of two openings 31 and 32 of the rotating plate 3 to the absolute value of the rotating angle θ, it is possible to accurately calculate the rotating angle θ from the result of detection of measuring light in the profile sensor 5 at a high speed.

Figure 8:
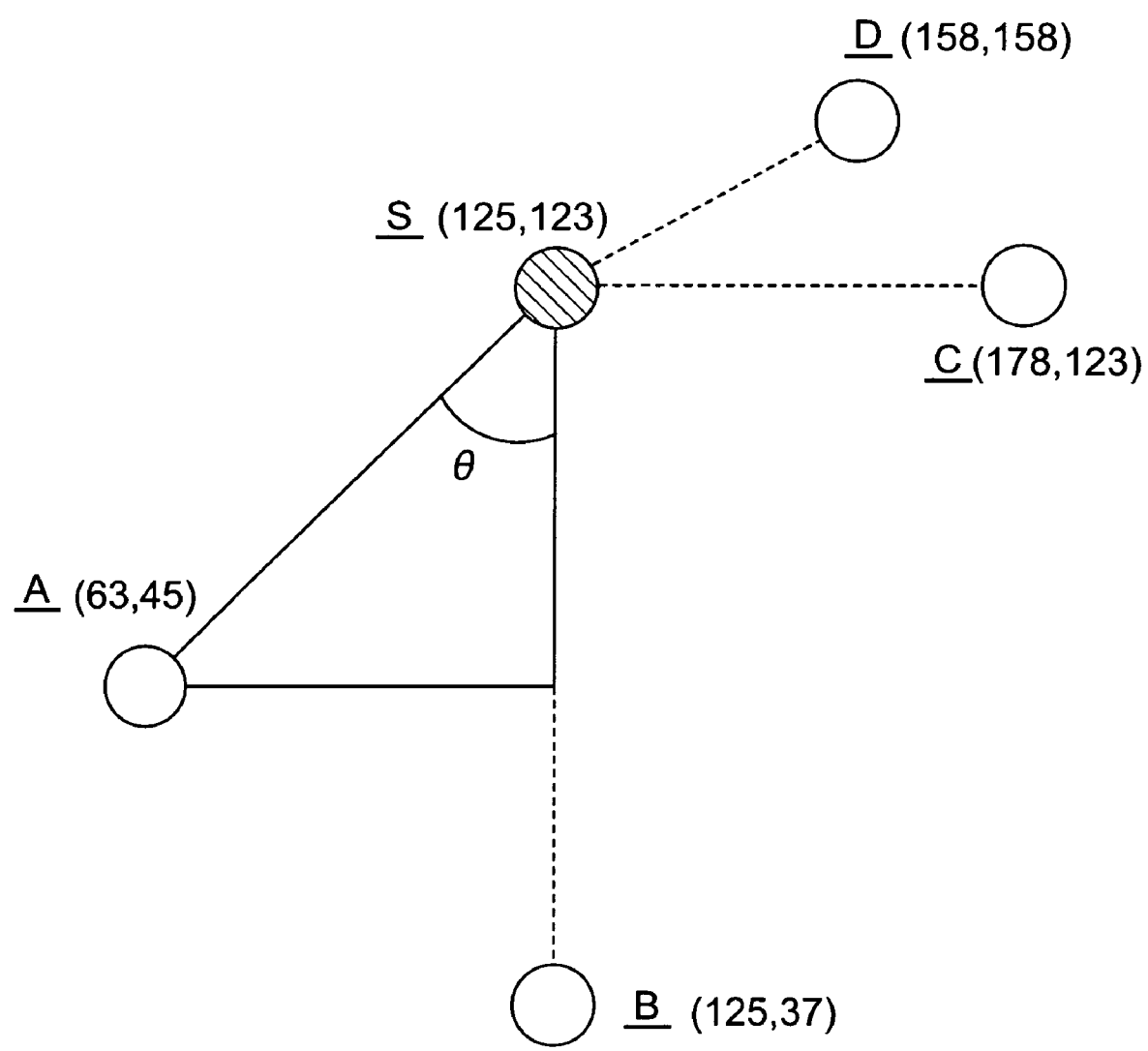
FIG. 8 is a view showing the positional relationship between two detected positions in the profile sensor.

Here, FIG. 8 is a view showing the positional relationship between two detected positions in the profile sensor. Also, FIG. 9 is a table showing angle calculations corresponding to the positional relationship of detected positions shown in FIG. 8. In FIG. 8, an example is shown, in which it is assumed that one detected position is the reference position S while the other detected positions are changed as relative positions A, B, C and D. As shown in FIG. 9, with respect to the positional relationship of these detected positions, it is possible to obtain the coordinate interval ΔX in the X-axis direction, coordinate interval ΔY in the Y-axis direction, and rotating angle θ (Refer to the angle θ shown in FIG. 8) on the basis of the X coordinate and Y coordinate of the respective detected positions. In addition, if the matching table, which is shown in FIG. 9, is prepared in advance as a ROM table, it is possible to accurately calculate the rotating angle θ at a high speed as described above. For such a table, it is sufficient that numbers of data points responsive to accuracy required for arrangement of openings in the rotating plate and measurement of the rotating angle are prepared.

Figure 10:
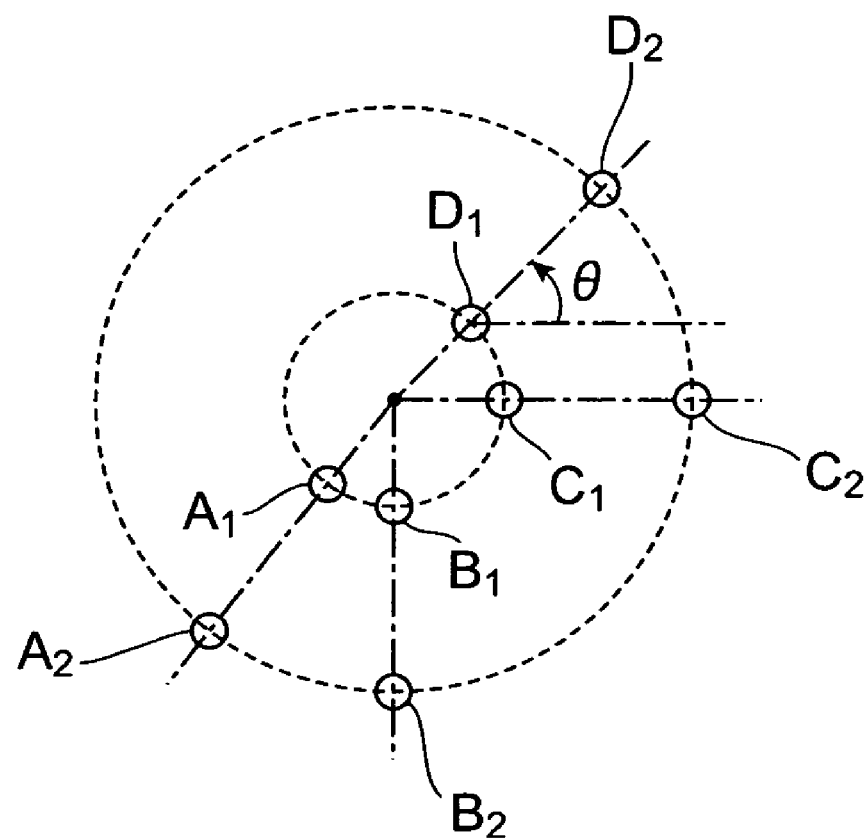
FIG. 10 is a view showing another example of the positional relationship between two detected positions in the profile sensor.

FIG. 10 is a view showing another example of the positional relationship between two detected positions in the profile sensor. Also, FIG. 11 is a table showing angle calculations corresponding to the positional relationship of the detected positions shown in FIG. 10. In FIG. 10, an example of four sets employing two detected positions where the inside first detected positions are $A_1$, $B_1$, $C_1$ and $D_1$ and the outside second detected positions $A_2$, $B_2$, $C_2$ and $D_2$ centering around the rotation axis is shown. As shown in FIG. 11, with respect to the positional relationship of these detected positions, it is possible to obtain the coordinate interval ΔX in the X-axis direction, coordinate interval ΔY in the Y-axis direction and rotating angle θ (Refer to the angle θ shown in FIG. 10) on the basis of the X coordinate and Y coordinate of the respective detected positions. Also, if a table corresponding to FIG. 11 is prepared in advance as a ROM table, it is possible to accurately calculate the rotating angle θ at a high speed as described above.

The absolute encoder according to the present invention is not limited to the above-described embodiments and the construction examples. It may be subjected to various modifications. For example, with respect to disposition of the openings 31 and 32 fixed in the rotating plate 3, in the above-described construction example, as shown in FIG. 1, the second opening 32 is provided on the extension of a straight line from the rotation axis 2 toward the first opening 31, whereby it is possible to preferably calculate the absolute value of the rotating angle θ based on the positional relationship of the two openings 31 and 32. However, in connection with disposition of the two openings 31 and 32, various constructions may be employed if the rotating angle θ can be measured.

The photodetector used in the encoder 1 is not limited to the above-described profile sensor 5. Various modifications are available. For example, although the areas 501 and 502 that become the photosensitive portions are roughly triangular in the profile sensor 5 shown in FIG. 2 and FIG. 3, it may be rectangular or comb-shaped.

Also, as regards the openings fixed in the rotating plate 3, the above-described embodiment is provided with two openings 31 and 32. However, such a construction may be employed, in which a third opening is further provided.

Figure 12:
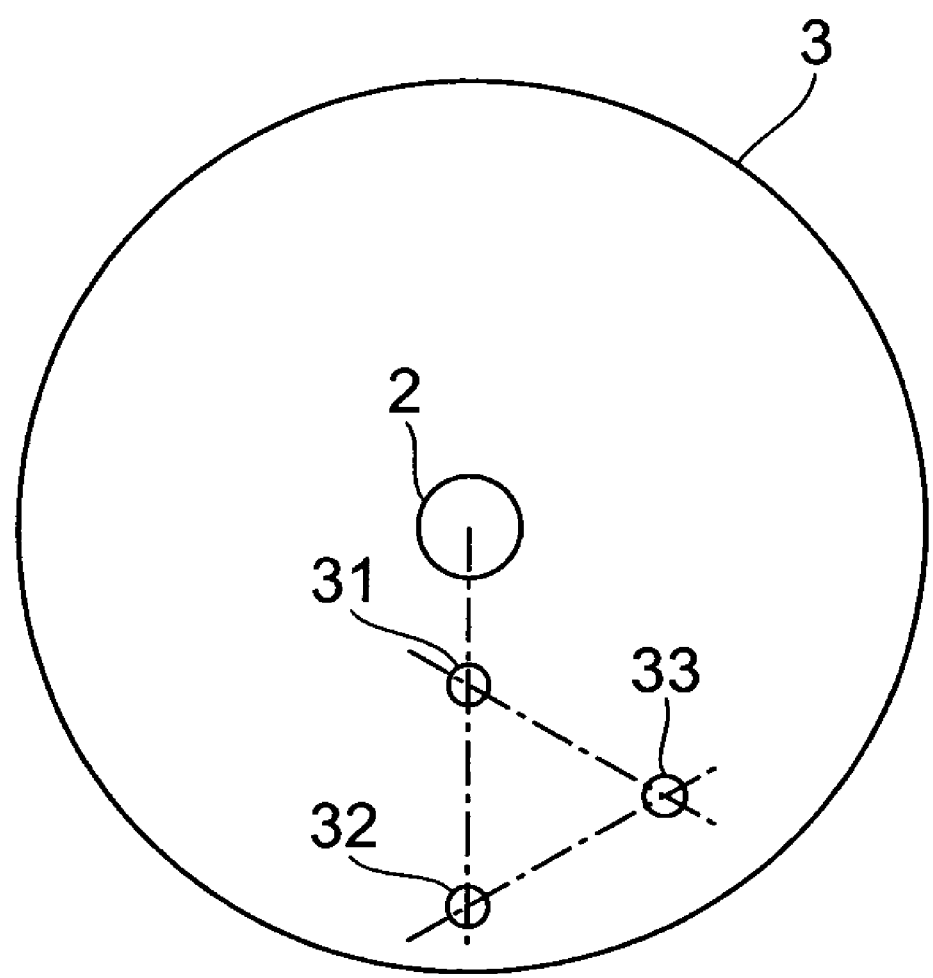
FIG. 12 is a plan view showing a construction of the rotating plate used in another embodiment of the absolute encoder.

FIG. 12 is a plan view showing the construction of the rotating plate used in another embodiment of the absolute encoder. In the present embodiment, as regards the first and second openings 31 and 32 which are provided in the rotating plate 3, as in the embodiment shown in FIG. 1, the second opening 32 is constructed so that it is located on the extension of the straight line from the rotation axis 2 toward the first opening 31. Also, in this rotating plate 3, the third opening 33 is formed in a prescribed positional relation with respect to the openings 31 and 32 in addition to the two openings 31 and 32. By using such three openings 31 through 33, it is possible to improve the measurement accuracy of the absolute value of the rotating angle.

In addition, in this case, on the basis of voltage signals from the signal processing part 6, which show the detection results of the measuring light in the profile sensor 5, the angle calculating part 8 (Refer to FIG. 1) obtains the first detected position corresponding to the measuring light component passed through the first opening 31, the second detected position corresponding to the measuring light component passed through the second opening 32, and the third detected position corresponding to the measuring light component passed through the third opening 33. And, based on the correlation of the three detected positions, the absolute value of the rotating angle of the rotation axis 2 and the rotating plate 3 is calculated.

In particular, in the construction shown in FIG. 12, the third opening 33 of the rotating plate 3 is formed at a prescribed position excluding any location on the straight line connecting the first opening 31 and the second opening 32. In detail, the third opening 33 is disposed, as shown in FIG. 12, so that the straight line connecting the first opening 31 and the third opening 33 to each other crosses, at any angle which is not zero, the straight line connecting the first opening 31 and the second opening 32 to each other. In the example shown in FIG. 12, the straight line connecting the first opening 31 and the third opening 33 to each other crosses, at 60 degrees, the straight line connecting the first opening 31 and the second opening 32 to each other, and the three openings 31 through 33 are disposed so as to form an equilateral triangle.

Thus, by measuring the rotating angle using the three openings 31 through 33 formed in the rotating plate 3, it is possible to improve the measurement accuracy of the absolute value of the rotating angle. In this case, if necessary, four or more openings may be provided in the rotating plate 3.

Further, in the above-described construction, the third opening 33 is located at a position apart from the straight line connecting the first opening 31 and the second opening 32 to each other. In such a construction, for example, even in a case where the first detected position and the second detected position of the openings 31 and 32 overlap each other in the profile of light intensity with respect to the X-axis direction or Y-axis direction, which is obtained by the profile sensor 5, the third detected position corresponding to the opening 33, which is located apart from the straight line connecting the openings 31 and 32 to each other, does not overlap at the same time. Therefore, even in the above-described case, it is possible to accurately calculate the absolute value of the rotating angle of the rotation axis 2 and the rotating plate 3 on the basis of the correlation between the detected positions of the openings 31 through 33.

Also, in such a construction in which three openings 31 through 33 are employed, it is preferable that the light supplying unit 4 is provided with the third light source fixed so as to face the photosensitive area of the profile sensor 5 with the third opening 33 placed therebetween, in addition to the above-described first light source 41 and second light source 42. Further, in this case, if the first through third light sources supply measuring light under supplying conditions differing from each other, it is possible to easily identify the detected positions corresponding to the openings 31 through 33. However, as regards the light supplying unit 4, a construction other than the above may be employed.

As described above, with an absolute encoder according to the present invention, it is possible to accurately measure the absolute value of the rotating angle of the rotation axis by a simple construction.

What is claimed is:

1. An absolute encoder comprising:
   a rotation axis;
   a rotating plate attached to the rotation axis, having a first opening and a second opening formed in a prescribed positional relation to the first opening;
   a photodetector that has a photosensitive area in which a plurality of pixels are two-dimensionally arrayed, is provided so as to face one side of the rotating plate, and is able to obtain light intensity profiles in a first direction and a second direction in the two-dimensional array, respectively;
   light supplying means that is provided so as to face the photosensitive area of the photodetector with the first opening and second opening of the rotating plate placed therebetween and supplies measuring light for measuring an angle; and
   angle calculating means for calculating an absolute value of the rotating angle of the rotation axis based on a correlation between a first detected position and a second detected position where the measuring light components passed through the first opening and second opening of the rotating plate are respectively detected by the photosensitive area of the photodetector,
   wherein, in said photodetector, one pixel is composed of a plurality of photosensitive portions outputting an electric current responsive to the intensity of respective incident light components being disposed on the same plane adjacent to each other;
   photosensitive portions at one side of a plurality of photosensitive portions composing corresponding respective pixels are electrically connected to each other over a plurality of pixels arrayed in the first direction; and
   photosensitive portions at the other side of a plurality of photosensitive portions composing corresponding respective pixels are electrically connected to each other over a plurality of pixels arrayed in the second direction.

2. An absolute encoder according to claim 1, comprising:
   a first signal processing circuit which is provided corresponding to the photosensitive portion group at one side, electrically connected to each other between a plurality of pixels arrayed in the first direction, and which outputs a voltage signal by carrying out a prescribed signal process onto an electric current output from the photosensitive portion group at one side; and
   a second signal processing circuit which is provided corresponding to the photosensitive portion group at the other side, electrically connected to each other between a plurality of pixels arrayed in the second direction, and which outputs a voltage signal by carrying out a prescribed signal process onto an electric current output from the photosensitive portion group at the other side;
   wherein said angle calculating means calculates the absolute value of the rotating angle of the rotation axis on the basis of the voltage signals output from the first signal processing circuit and second signal processing circuit.

3. An absolute encoder according to claim 1, wherein said angle calculating means calculates the absolute value of the rotating angle of the rotation axis with reference to an angle calculating table showing a matching relationship between the correlation between the first detected position and the second detected position and the absolute value of the rotating angle of the rotation axis.

4. An absolute encoder according to claim 1, wherein said light supplying means includes a first light source provided so as to face the photosensitive area of the photodetector with the first opening of the rotating plate placed therebetween; and a second light source provided so as to face the photosensitive area of the photodetector with the second opening placed therebetween.

5. An absolute encoder according to claim 4, wherein the first light source and the second light source supply the measuring light components under supplying conditions differing from each other.

6. An absolute encoder according to claim 1, wherein the second opening of the rotating plate is formed at a prescribed position located on the extension of the straight line from the rotation axis toward the first opening.

7. An absolute encoder according to claim 1, wherein said rotating plate includes a third opening formed in a prescribed positional relation to the first opening and the second opening; and
   said angle calculating means calculates the absolute value of the rotating angle of the rotation axis based on a correlation between the first detected position, the second detected position, and a third detected position where the measuring light component passed through the third opening of the rotating plate is detected by the photosensitive area of the photodetector.

8. An absolute encoder according to claim 7, wherein the third opening of the rotating plate is formed at a prescribed position excepting on the straight line connecting the first opening and the second opening.

* * * * *